April 21, 1959  D. J. LOWE ET AL  2,883,037
TAKE-UP FOR CONVEYORS
Filed June 17, 1955  4 Sheets-Sheet 1
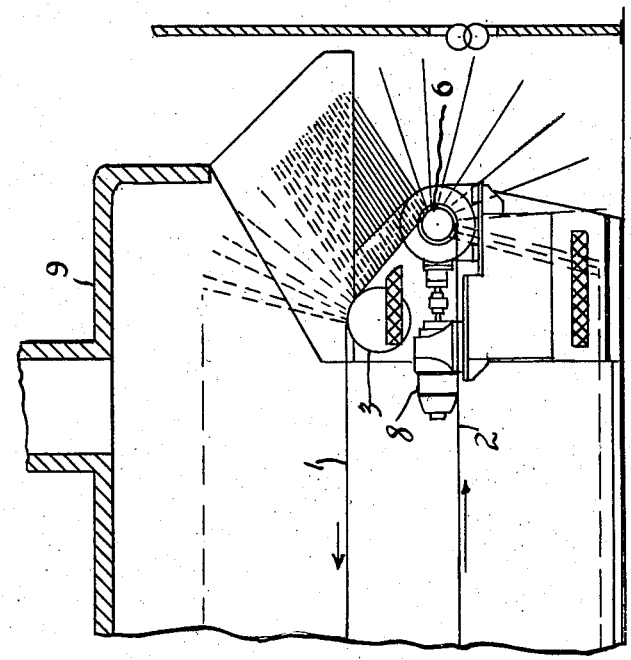
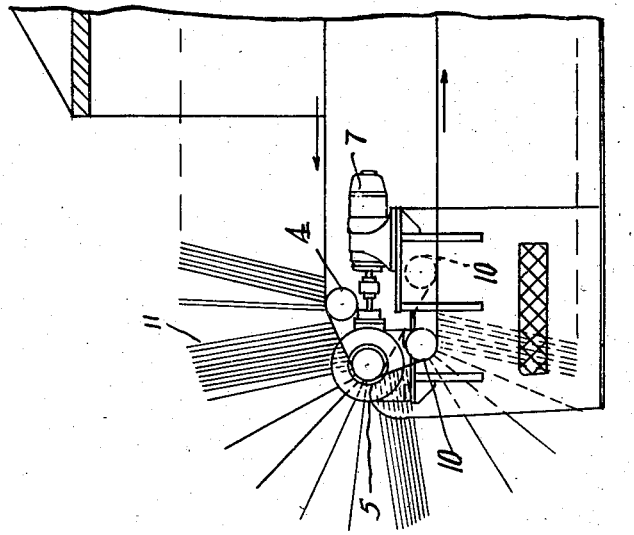
Fig. 1
INVENTORS
DONALD J. LOWE AND
BY FOSTER F. HILLIX
Oberlin & Limbach
ATTORNEYS.

April 21, 1959  D. J. LOWE ET AL  2,883,037
TAKE-UP FOR CONVEYORS
Filed June 17, 1955  4 Sheets-Sheet 2

INVENTORS
DONALD J. LOWE AND
BY FOSTER F. HILLIX.
Oberlin & Limbach
ATTORNEYS.

April 21, 1959
D. J. LOWE ET AL
2,883,037
TAKE-UP FOR CONVEYORS
Filed June 17, 1955
4 Sheets-Sheet 4
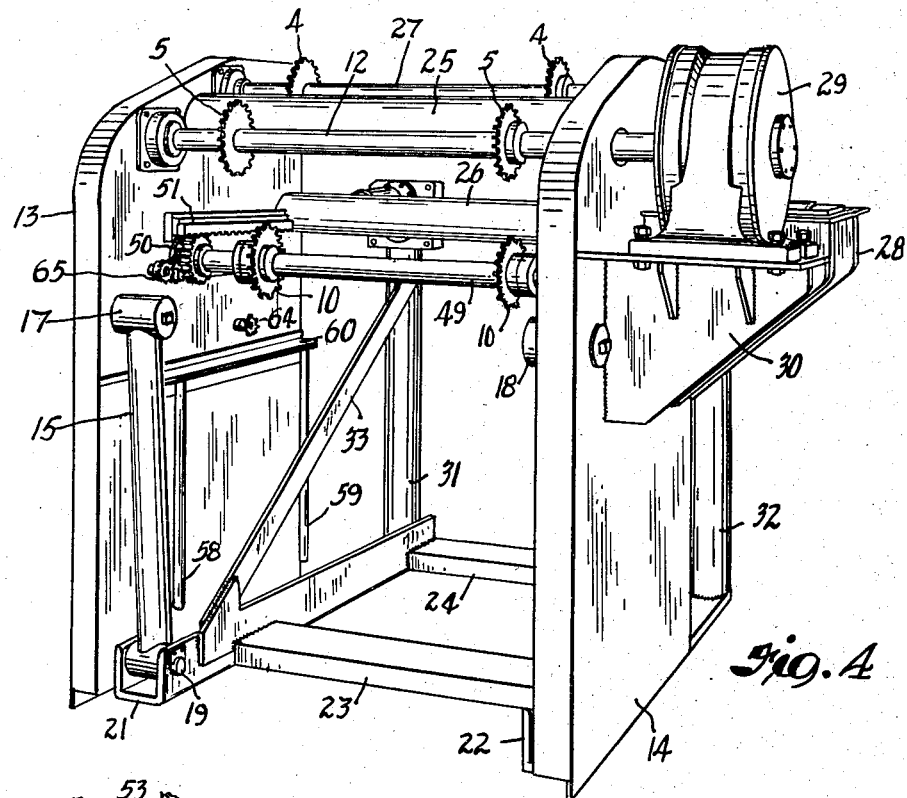
Fig. 4
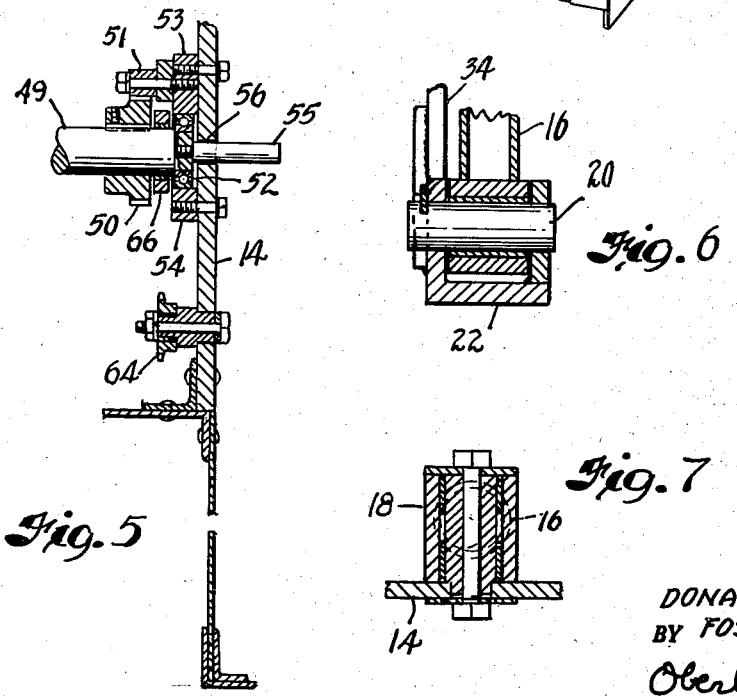
Fig. 5
Fig. 6
Fig. 7
INVENTORS
DONALD J. LOWE AND
BY FOSTER F. HILLIX
Oberlin + Limbach
ATTORNEYS.

United States Patent Office 2,883,037
Patented Apr. 21, 1959

2,883,037

TAKE-UP FOR CONVEYORS

Donald J. Lowe, Northfield Center, and Foster F. Hillix, Lakewood, Ohio, assignors to Young Brothers Company, Cleveland, Ohio, a corporation of Michigan Application June 17, 1955, Serial No. 516,082

16 Claims. (Cl. 198—208)

This invention relates as indicated to a novel take-up for conveyors, and more particularly to a take-up for wicket conveyors commonly utilized in industrial ovens for the drying of lithographed metal sheets and the like.

Wicket type conveyors ordinarily comprise two parallel continuous conveyor chains traveling in upper and lower courses through a long oven adapted to be heated by introduction of hot air and gases. Upstanding wickets with appropriate work supporting brackets are carried between the traveling chains and are adapted to support large flat lithographed metal sheets and the like thereon for proper uniform drying of the lithographed coating. In order that such coatings may be adequately dried, at a reasonable rate of conveyor travel, the ovens in question must be quite long, and the tendency at the present time is toward longer and longer ovens in order to permit greater speeds of conveyor travel and accordingly increased production. As the conveyor chains thus require to be lengthened, certain serious operational problems are encountered.

At the start of a run, while the oven is heating up, the metal links of the conveyor chain naturally expand and lengthen as they become heated, with a consequent over-all increase in the length of the conveyor which may amount to from 1 to 2 inches in the case of a short conveyor to as much as 15 inches in the case of a very long conveyor. There is, moreover, eventually an appreciable amount of wear at the pivotal connections of the conveyor chain links resulting in a further increase in the over-all length of the chain.

In the past, it has been accepted practice to provide a pair of sprockets about which the lower courses of the conveyor chains pass adjacent one of the sets of conveyor end sprockets, such lower sprockets being counterweighted in a manner tending to shift the same horizontally toward such end and thereby to take up slack in the chains. This method is simple and effective when only a very small amount of slack is thus developed but is unsuitable when the slack is at all substantial inasmuch as considerable horizontal shifting of the lower sprockets affords but a relatively small increase in the path of travel of the conveyor chains.

The conveyor will ordinarily be driven through at least one set of end sprockets, and if the oven is very long, both ends may be thus driven.

It is accordingly a principal object of our invention to provide conveyor take-up means effective automatically to take up slack in a continuously traveling conveyor without interfering with the operation of the latter.

A further object is to provide apparatus and method for taking up slack in a wicket type chain conveyor where it is obviously impractical to take up slack as is done in the case of various other types of conveyors where festooning and the like are feasible.

Still another object is to provide counterweighted take-up means automatically operative continuously to take up slack in a conveyor and adapted to be relocated for further effective operation when such counterweight has descended a predetermined distance.

A further object is to provide such conveyor take-up means including means effective intermittently to shift the principal conveyor end supporting means to lengthen the courses of the conveyor.

Yet another object is to provide such take-up means wherein one means is utilized continuously to take up slack in the conveyor and another means is provided intermittently to take up slack in the conveyor in more substantial increments.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a semi-diagrammatic side elevation of a wicket type conveyor passing through an elongated oven (in longitudinal section), showing the drive means for such conveyor;

Fig. 4 is a perspective view of such mechanism with certain elements of the adjusting means omitted;

Fig. 5 is a vertical section through one of the side frame panels taken on the line 5—5 on Fig. 2;

Fig. 6 is a fragmentary section taken on the line 6—6 on Fig. 2; and

Fig. 7 is a fragmentary section taken on the line 7—7 on Fig. 2.

Figure 2:
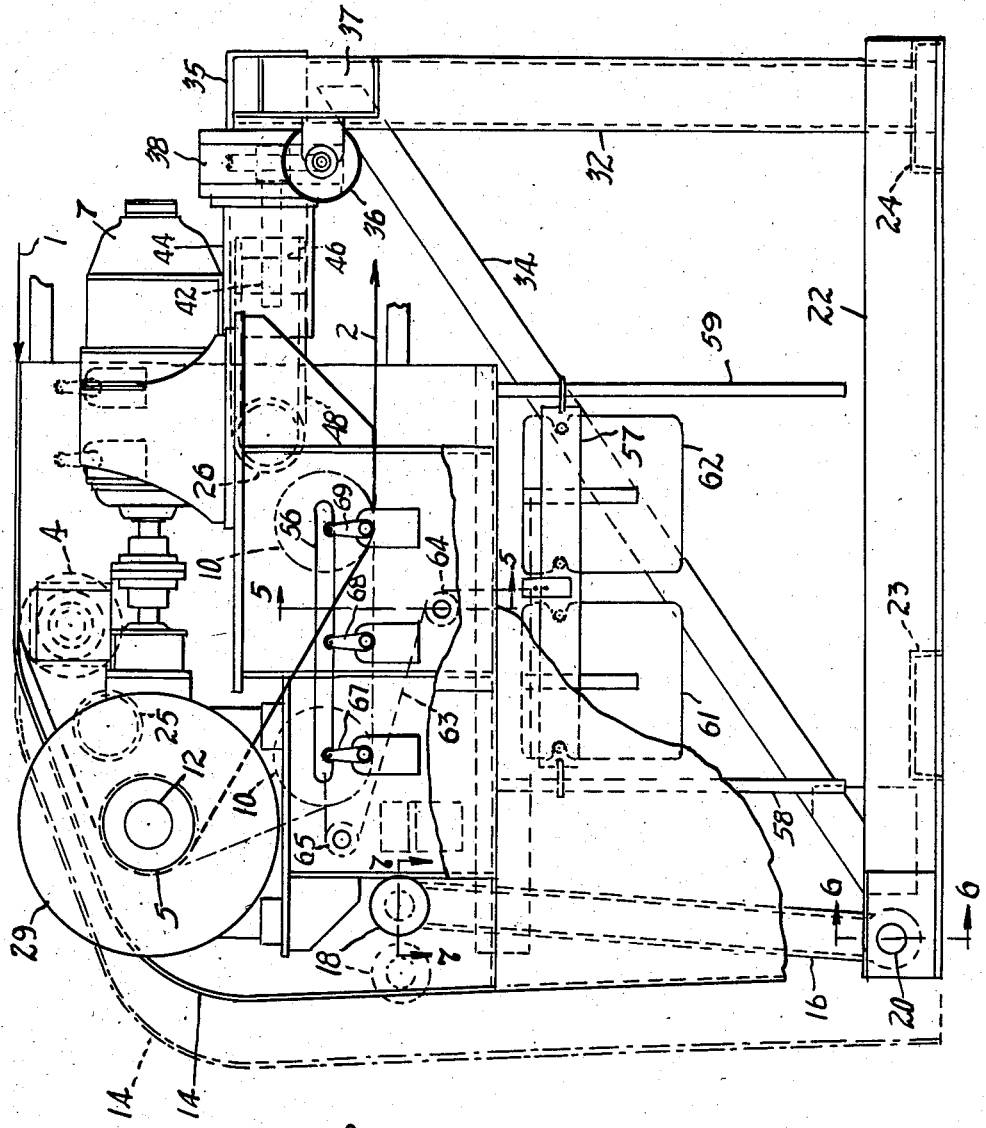
Fig. 2 is a side elevational view of the conveyor drive means at one end of the oven together with associated take-up means embodying the principles of our invention.
Figure 3:
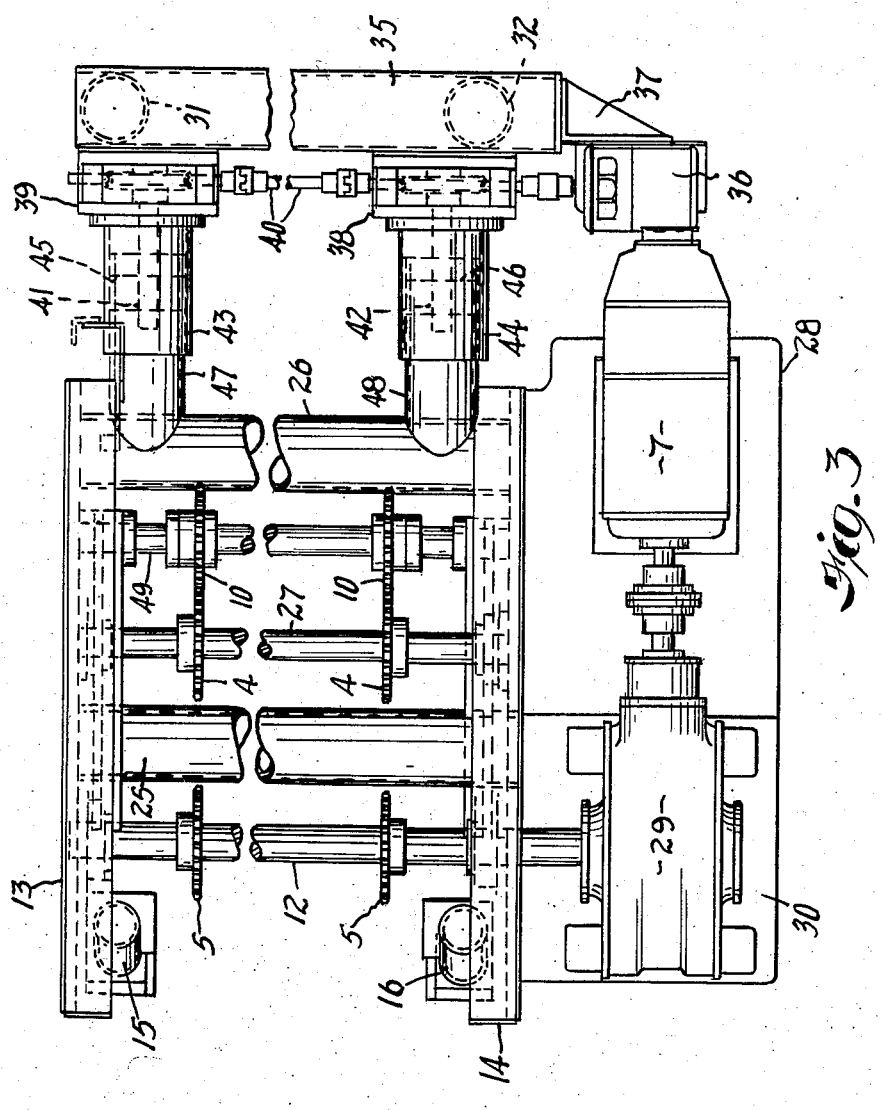
Fig. 3 is a top plan view of the mechanism of Fig. 2.

Referring now more particularly to Fig. 1 of the drawing, the take-up means of our invention is particularly adapted for employment with a wicket type oven conveyor utilized in the processing of lithographed sheets and the like. Such conveyor may comprise two parallel chains having upper and lower courses 1 and 2, and passing about upper sprockets 3 and 4 and end sprockets 5 and 6. Such end sprockets at one or both ends of the oven may be driven, and in the case of relatively long ovens both such end sprockets will ordinarily be driven as by electric motors 7 and 8. The greater part of the conveyor extends through elongated oven 9 provided with the usual ducts for introduction of heating gases, etc.

As explained in more detail below, the conveyor chains also pass about lower sprockets 10 which are shiftable from dotted line position as shown in Fig. 1 to solid line position as the conveyor chains elongate due to the effects of heat and wear. As previously indicated, it is broadly old in the art thus to provide such take-up means, but we make use of the same in a novel manner in combination with mechanism operative to increase the over-all length of the conveyor courses. The wickets 11 may desirably be of the type described and claimed in the application of James D. Russell for U.S. Letters Patent Serial No. 442,530 filed July 12, 1954, entitled "Wicket for Sheet Conveyor," and the oven may be of the type disclosed in Patent No. 2,668,366 to C. A. Barnett, "Heat Processing Apparatus."

As shown in an enlarged scale in Figs. 2–7 inclusive, conveyor end drive sprockets 5 are secured to drive shaft 12 journaled in side frame members 13 and 14 supported near their outer ends on swinging legs 15 and 16 pivotally connected thereto at 17 and 18 respectively. The lower ends of such legs are pivotally connected at 19 and 20 to stationary base frame members 21 and 22 joined by cross-members 23 and 24. Such side frame members 13 and 14 are rigidly interconnected by cross-members 25 and 26 for bodily swinging movement longitudinally of the conveyor when legs 15 and 16 are rocked. Idler sprockets 4 are mounted on shaft 27 between such two side frame members.

Conveyor drive motor 7 is supported on a side bracket 28 on side frame member 14 and is adapted to drive shaft 12 and sprockets 5 through a worm gear reduction unit 29 carried on bracket 30. Such drive means is accordingly movable back and forth together with such side frame members and sprockets 5.

Uprights 31 and 32 are welded to the rearward ends of base frame members 21 and 22 respectively and are rigidly braced by angular braces 33 and 34. A bridge member 35 rigidly interconnects the upper ends of uprights 31 and 32. A reversible electric motor 36 is mounted on bracket 37 on one end of such bridge member and is adapted to drive worm gear units 38 and 39 through worm shaft 40, the worm gear units in turn driving lead screws 41 and 42 enclosed within tubular guards 43 and 44 mounted on the worm gear housings. Such screws engage in nuts 45 and 46 carried in tubular extensions 47 and 48 welded to cross-member 26. It will accordingly be apparent that when motor 36 is energized, screws 41 and 42 will be driven to rock the conveyor end supporting carriage (comprising side frame members 13 and 14) forwardly or rearwardly on pivotal legs 15 and 16. The housings for worm gears 38 and 39 may be bolted to bridge 35 with sufficient play to accommodate the very slight tilting resulting from this rocking movement.

Sprockets 10 turn freely on cross-shaft 49, and gears such as 50 are keyed to such shaft adjacent the respective ends thereof for engagement with downwardly facing racks 51 (Fig. 5). Anti-friction rollers 52 at the ends of the shaft are adapted to roll along a horizontal guideway defined by upper and lower rails 53 and 54, gears 50 and racks 51 serving to ensure that shaft 49 is not canted to any degree when rolling back and forth along such guideway. A finger 55 projecting from one end of shaft 49 extends through slot 56 in side frame member 14 for a purpose explained below.

Inside each side frame member 13 and 14 is mounted a slide such as 57 for vertical reciprocation along guide members 58 and 59 depending from bracket 60 and heavy weights 61 and 62 are carried by such slides. Chains 63 pass about sprockets 64 and 65 to suspend such slides from the respective ends of shaft 49 by means of clevises such as 66 intermediate gears 50 and rollers 52. There is accordingly a strong pull exerted on shaft 49 by weights 61 and 62 to roll such shaft forwardly along its guideways to shift sprockets 10 from the right-hand position indicated in Fig. 2 to the left-hand position as indicated in such figure. This obviously has the effect of taking up slack in the conveyor chains passing about such sprockets by likewise shifting such chain as shown in Fig. 2.

Further details of the mechanism may best be understood by a description of the operation of the same. As the conveyor chains elongate due to heat, wear or other causes, slides 57 will descend with consequent shifting of sprockets 10 to the left as viewed in Fig. 2 to take up the slack in the conveyor chains. When such slides have descended substantially the entire distance permitted to them, finger 55 projecting through slot 56 from shaft 49 will engage limit switch 67 to energize motor 36 to drive screws 41 and 42 to rock the drive sprocket carriage comprising side frame members 13 and 14 to the left as viewed in Fig. 2 on its pivotal legs 15 and 16. This movement, of course, effects in extension of the conveyor courses taking up slack in the conveyor chains and causing sprockets 10 and their shaft 49 to roll rearwardly (to the right as viewed in Fig. 2) with consequent elevation of weighted slides 57. This movement continues until finger 55 engages limit switch 68 to de-energize motor 36. Still further slackening of the conveyor chains will now permit sprockets 10 and shaft 49 again to travel to the left as viewed in Fig. 2, with corresponding descent of weighted slides 57 until limit switch 67 is engaged by finger 55 to energize motor 36 again to drive carriage shifting screws 41 and 42. This sequence of operations may repeat itself several times, being limited only by the length of lead screws 41 and 42 and the general dimensions of the mechanism. The particular embodiment of our invention illustrated is intended to take up approximately 15 inches of slack in the conveyor chains, but obviously the proportions of the several parts may be modified as desired.

When the oven is shut down and permitted to cool, with consequent shrinkage of the conveyor chains, sprockets 10 and their shaft 49 will be caused to roll to the furthest right-hand position shown in dotted line in Fig. 2, elevating slides 57 to the maximum extent. In this position, finger 55 will engage and actuate limit switch 69 to energize reversible electric motor 36 to drive lead screws 41 and 42 in the opposite direction and accordingly to rock the conveyor drive sprocket carriage comprising side frame members 13 and 14 to the right as viewed in Fig. 2, correspondingly shortening the conveyor chain courses. When finger 55 engages limit switch 68, motor 36 will be de-energized. This cycle may likewise be repeated until the gradual shrinkage of the conveyor chains has been entirely compensated.

It will be seen from the foregoing that we have provided conveyor take-up means which is continually effective to take up slack in the conveyor through the action of weighted slides 57 and which additionally is intermittently effective to lengthen the over-all span of the conveyor by shifting the end sprockets of the latter outwardly by predetermined increments. Such latter take-up means is automatically responsive to operation of the weighted take-up means, being actuated thereby. Despite the employment of the lead screws for positively shifting the conveyor end sprockets, the conveyor chain will never be subjected to a greater tensioning force than that of the weights suspended from slides 57 and there is accordingly no danger of overstressing the conveyor elements or other parts of the mechanism. The amount of slack take-up afforded, however, may easily be 3 to 5 times that ordinarily afforded by the usual counterweighted sprockets. Accordingly, as the conveyor tends to lengthen with use and consequent wear, it is not necessary to remove links from the conveyor chain, a tedious operation, and our new take-up means will ordinarily prove adequate throughout the life of the conveyor.

Other modes of applying the principle of the invention may be employed, change being made as regards the details described, provided the features stated in any of the following claims or the equivalent of such be employed.

We therefore particularly point out and distinctly claim as our invention:

1. In an elongated oven having a wicket type conveyor installed therein for heat processing lithographed sheets and the like, said oven having a loading end and an unloading end, said conveyor comprising two laterally spaced chains arranged in upper and lower courses, drive sprockets on a fixed axis at such loading end about which said chains pass, drive means for said sprockets, sprockets at such unloading end about which said chains pass, and drive means for said latter sprockets; slack take-up means for said chains comprising a frame at said unloading end on which the aforesaid corresponding drive sprockets are journalled, said drive means for said latter sprockets being likewise mounted on said frame, a fixed base for said frame, upstanding legs on said base pivotally connected thereto and to said frame for oscillation of said frame longitudinally of said oven and conveyor, said frame including laterally spaced side members rigidly interconnected, screw means mounted on said base longitudinally of said conveyor and threadedly engaging said frame a reversible electric motor on said base operative to drive said screw means to rock said frame on said legs, parallel horizontal guideways on said respective side frame members below the level of said adjacent drive sprockets, having its end portions secured in said guideways for rolling movement therealong longitudinally of said conveyor, racks on said side frame members parallel to said guideways, gears on said shaft engaging said respective racks to ensure against canting of said shaft, sprockets on said shaft adapted to engage with said chains of the lower course coming from the drive sprockets on said frame, vertical guideways on said side frame members, weights arranged for reciprocation along said guideways, means flexibly connecting said weights and shaft and passing about pulley means beneath said drive sprockets on said frame to pull said shaft and the sprockets thereon horizontally toward the near end of said conveyor to tension the latter, a limit switch positioned for actuation by said shaft upon predetermined movement of the latter under influence of said weights, such actuation of said switch being operative to energize said motor to drive said screw means to rock said frame to shift the axis of the adjacent conveyor drive sprockets outwardly away from the other end of said conveyor and thereby to lengthen the courses of the latter, said shaft being thereby moved inwardly relative to said frame with consequent renewed elevation of said weights, a second limit switch located approximately midway in the path of travel of said shaft operative when actuated thereby to stop said motor, and a third limit switch located at the other end of the path of travel of said shaft operative when actuated thereby to energize said motor to drive said screw means in the opposite direction to rock said frame to shorten the overall length of said conveyor courses.

2. In an elongated oven having a continuous conveyor longitudinally disposed therein, and sprockets at each end about which said conveyor passes; slack take-up means for said conveyor comprising a frame at one end on which the corresponding said sprockets are journalled, a fixed base for said frame, upstanding legs on said base pivotally connected thereto and to said frame for oscillation of said frame longitudinally of said oven and conveyor, said frame including laterally spaced side members rigidly interconnected, screw means mounted on said base longitudinally of said conveyor and threadedly engaging said frame, a reversible electric motor on said base operative to drive said screw means to rock said frame on said legs, parallel horizontal guideways on said respective side frame members below the level of said adjacent sprockets, having its end portions secured in said guideways for rolling movement therealong longitudinally of said conveyor, racks on said side frame members parallel to said guideways, gears on said shaft engaging said respective racks to ensure against canting of said shaft, sprockets on said shaft adapted to engage with the lower course of said conveyor coming from the first-named sprockets on said frame, weights arranged for vertical reciprocation, means flexibly connecting said weights and shaft and passing about pulley means disposed on said frame toward the near end of said conveyor to pull said shaft toward such near end to tension said conveyor, a limit switch positioned for actuation by said shaft upon predetermined movement of the latter under influence of said weights, such actuation of said switch being operative to energize said motor to drive said screw means to rock said frame to shift the axis of the adjacent conveyor sprockets outwardly away from the other end of said conveyor and thereby to lengthen the courses of the latter, said shaft being thereby moved inwardly relative to said frame with consequent renewed elevation of said weights, a second limit switch located approximately midway in the path of travel of said shaft operative when actuated thereby to stop said motor, and a third limit switch located at the other end of the path of travel on said shaft operative when actuated thereby to energize said motor to drive said screw means in the opposite direction to rock said frame to shorten the over-all length of said conveyor courses.

3. Conveyor take-up means for an elongated flexible conveyor having upper and lower courses subject to expansion and contraction, comprising respective end members about which said conveyor passes, a frame at one end carrying a corresponding end member, power means operative to shift said frame and end member toward and away from the other said end member to shorten and lengthen said courses, movable conveyor course tensioning means carried by said frame, a weight connected to said tensioning means effective to maintain a substantially uniform pull on said tensioning means, said tensioning means being relatively movable in said frame in one direction when said conveyor expands and movable in the other direction when said conveyor contracts, with consequent lowering and raising of said weight, and control means for said power means responsive to such movement of said tensioning means in said frame operative to energize said power means to shift said frame and end member carried thereby away from said other end member to lengthen said courses when said tensioning means moves a predetermined distance under the influence of said weight and to energize said power means to shift said frame and end member carried thereby in the opposite direction toward said other end member to shorten said courses when said weight is raised a predetermined distance due to movement of said tensioning means by contraction of said conveyor.

4. Conveyor take-up means for an elongated flexible continuous conveyor having respective end members supporting said conveyor and about which it passes, comprising a support for one said end member mounted for shifting bodily longitudinally of said conveyor to take up slack therein, power means operative selectively to shift said support and end member carried thereby toward and away from the other end of said conveyor, further conveyor tensioning means engaging said conveyor intermediate said end members and operative to maintain tension thereon, said latter tensioning means being mounted for movement as said conveyor becomes slack and taut between said end members, and control means for said power means responsive to such movement of said tensioning means in one direction to energize said power means to shift said support to increase the over-all length of said conveyor between said end members and responsive to such movement of said tensioning means in the other direction to energize said power means to shift said support to decrease the over-all length of said conveyor between said end members.

5. The mechanism of claim 4, wherein said tensioning means includes a weight arranged to exert a uniform outward pull on a course of said conveyor.

6. The mechanism of claim 4, wherein said power means includes a reversible electric motor and screw means driven thereby engaging said support.

7. The mechanism of claim 4, wherein said power means includes a reversible electric motor and screw means driven thereby engaging said support, and wherein said control means includes limit switches arranged for operation by movement of said tensioning means, one said switch being operable to energize said motor for rotation in one direction, another said switch being operable to energize said motor for rotation in the other direction, and an intermediate switch being operable to stop said motor.

8. The mechanism of claim 4 wherein said support is mounted for rocking movement by said power means.

9. Conveyor take-up means for an elongated flexible continuous conveyor having respective end members supporting said conveyor and about which it passes, comprising a support for one said end member mounted for rocking bodily longitudinally of said conveyor to take up slack therein, and means operative in response to formation of slack in said conveyor to rock said support to take up such slack and operative in response to shrinkage of said conveyor to rock said support to accommodate such shrinkage.

10. In an endless conveyor, the combination of conveyor tensioning means, conveyor lengthening means, and means responsive to movement of said tensioning means operative to actuate said lengthening means.

11. The mechanism of claim 10, wherein said tensioning means is weighted to maintain uniform tension on said conveyor.

12. In an endless chain conveyor having weighted tensioning means engaging the same, an end support mounted for shifting longitudinally of the conveyor to lengthen and shorten the latter, sprockets on said support about which said conveyor passes from one course to the other, said sprockets being on fixed axes relative to said support, power means operative thus to shift said end support back and forth, and control means arranged for actuation by movement of said tensioning means to energize said power means to lengthen and shorten the span of said conveyor to accommodate extension and contraction of said chain.

13. The mechanism of claim 12, wherein said weighted tensioning means include shiftable sprockets engaging a course of said conveyor and mounted for movement bodily back and forth with extension and contraction of such course.

14. The mechanism of claim 12, wherein said weighted tensioning means include shiftable sprockets engaging a course of said conveyor and mounted for movement bodily back and forth on a path offset but longitudinally parallel to the path of said conveyor in accordance with extension and contraction of such course.

15. The mechanism of claim 12, including drive means for said sprockets also carried by said shiftable support.

16. The mechanism of claim 12, wherein said control means includes three limit switches adapted to be actuated by said tensioning means, one said switch being operative to energize said power means to shift said support to lengthen the span of said conveyor when said tensioning means moves in response to increase in slack in said conveyor, another said switch being operative to energize said power means to shift said support to shorten such span when said tensioning means is moved in response to tightening of said conveyor, and the third switch being operative to stop said power means when said tensioning means is in a normal intermediate position.

References Cited in the file of this patent
UNITED STATES PATENTS

| | | |
|---|---|---|
| 395,883 | Dodge | Jan. 8, 1889 |
| 2,306,448 | Kratz | Dec. 29, 1942 |
| 2,640,582 | Madeira | June 2, 1953 |